(12) United States Patent
Morozumi et al.

(10) Patent No.: US 10,897,049 B2
(45) Date of Patent: Jan. 19, 2021

(54) SEPARATOR ASSEMBLY FOR FUEL CELL AND METHOD FOR MANUFACTURING SEPARATOR ASSEMBLY FOR FUEL CELL

(71) Applicant: TOYOTA SHATAI KABUSHIKI KAISHA, Kariya (JP)

(72) Inventors: Eiichiro Morozumi, Kariya (JP); Michi Hashiba, Kariya (JP); Takayuki Suzuki, Kariya (JP)

(73) Assignee: TOYOTA SHATAI KABUSHIKI KAISHA, Kariya (JP)

( * ) Notice: Subject to any disclaimer, the term of this patent is extended or adjusted under 35 U.S.C. 154(b) by 47 days.

(21) Appl. No.: 16/296,184

(22) Filed: Mar. 7, 2019

(65) Prior Publication Data

US 2019/0288299 A1    Sep. 19, 2019

(30) Foreign Application Priority Data

Mar. 13, 2018    (JP) ................................ 2018-045720

(51) Int. Cl.

| | |
|---|---|
| *H01M 8/0228* | (2016.01) |
| *H01M 8/0206* | (2016.01) |
| *H01M 8/0297* | (2016.01) |
| *H01M 8/0254* | (2016.01) |
| *H01M 8/1018* | (2016.01) |
| *B23K 26/21* | (2014.01) |

(52) U.S. Cl.
CPC ....... *H01M 8/0228* (2013.01); *H01M 8/0206* (2013.01); *H01M 8/0254* (2013.01); *H01M 8/0297* (2013.01); *B23K 26/21* (2015.10); *H01M 2008/1095* (2013.01)

(58) Field of Classification Search
None
See application file for complete search history.

(56) References Cited

U.S. PATENT DOCUMENTS

| | | | |
|---|---|---|---|
| 2005/0252892 A1 | 11/2005 | Newman et al. | |
| 2008/0305385 A1* | 12/2008 | Smiljanich | H01M 8/0215 429/494 |
| 2009/0117431 A1* | 5/2009 | Obika | H01M 8/0206 429/465 |
| 2016/0336605 A1* | 11/2016 | Tanimura | H01M 8/0297 |

FOREIGN PATENT DOCUMENTS

JP    2007-311074 A    11/2007

OTHER PUBLICATIONS

Extended European Search Report issued in corresponding application No. EP 19160471.9, dated Aug. 21, 2019.

* cited by examiner

*Primary Examiner* — Scott J. Chmielecki
(74) *Attorney, Agent, or Firm* — Maschoff Brennan

(57) ABSTRACT

A separator assembly for a fuel cell includes a first separator, a second separator, and a joined portion. In the joined portion, the first separator and the second separator are joined to each other through laser welding. The first separator includes a first surface that is intended to be opposed to the membrane electrode assembly. The first surface of the first separator includes an exposed portion where the base of the first separator is exposed. The second separator includes a second surface that is intended to be opposed to the membrane electrode assembly. A film including conductive particles is arranged on the entire second surface of the second separator. The joined portion is formed by irradiating the exposed portion of the first separator with laser.

3 Claims, 2 Drawing Sheets

US 10,897,049 B2

SEPARATOR ASSEMBLY FOR FUEL CELL AND METHOD FOR MANUFACTURING SEPARATOR ASSEMBLY FOR FUEL CELL

BACKGROUND

The present invention relates to a separator assembly for a fuel cell and a method for manufacturing a separator assembly for a fuel cell.

A polymer electrolyte fuel cell includes a fuel cell stack configured by single cells laminated with one another. Each single cell includes a membrane electrode assembly and two separators that hold the membrane electrode assembly in between. A fuel gas passage through which fuel gas is supplied is defined between the separator (hereinafter referred to as first separator) located on the anode side of the membrane electrode assembly and the membrane electrode assembly. An oxide gas passage through which oxidizing gas is supplied is defined between the separator (hereinafter referred to as second separator) located on the cathode side of the membrane electrode assembly and the membrane electrode assembly. The separators each include a base made of a metal plate such as a stainless steel plate. Films that enhance the corrosion resistance and conductivity of the bases are formed on the entire surfaces of the bases opposed to the membrane electrode assembly (refer to, for example, Japanese Laid-Open Patent Publication No. 2007-311074). Further, the fuel cell stack described in the document includes a separator assembly where the first separator and the second separator, which are adjacent to each other in the laminating direction of the single cells, are joined to each other through laser welding in order to reduce the contact resistance between the first separator and the second separator.

In the separator assembly of the document, when the first separator and the second separator are laser-welded to each other, laser irradiation is performed on the films, which respectively coat the bases. In this case, when part of the films is melted and then enters the welded parts of the bases, the bases may corrode easily. In addition, laser irradiation may cause evaporation (ablation) to occur locally in the films. In this case, when the laser energy is used to vaporize the films, the energy needed to weld the bases to each other may tend to lack, resulting in weld failure. Such inconveniences occur not only in the separator assembly, in which the separators each including the base made of a stainless steel plate are joined to each other, but also occur in the same manner in a separator assembly in which separators each having a base made of a metal plate other than a stainless steel plate are joined to each other.

SUMMARY

It is an object of the present invention to provide a separator assembly for a fuel cell and a method for manufacturing a separator assembly for a fuel cell capable of limiting corrosion of the separator and limiting the occurrence of weld failure.

A separator assembly for a fuel cell that solves the above-described problem is applied to a fuel cell stack configured by single cells laminated in a laminating direction. Each of the single cells includes a membrane electrode assembly, a first separator having a base made of a metal plate and arranged on an anode side of the membrane electrode assembly, and a second separator having a base made of a metal plate and arranged on a cathode side of the membrane electrode assembly. The separator assembly includes the first separator and the second separator. The first separator and the second separator are adjacent to each other in the laminating direction. The separator assembly also includes a joined portion where the first separator and the second separator are joined to each other through laser welding. The first separator includes a first surface that is intended to be opposed to the membrane electrode assembly. The first surface of the first separator includes an exposed portion where the base of the first separator is exposed. The second separator includes a second surface that is intended to be opposed to the membrane electrode assembly. A film including conductive particles is arranged on the entire second surface of the second separator. The joined portion is formed by irradiating the exposed portion of the first separator with laser.

A method for manufacturing a separator assembly for a fuel cell that solves the above-described problem is provided. The separator assembly is applied to a fuel cell stack configured by single cells laminated in a laminating direction. Each of the single cells includes a membrane electrode assembly, a first separator having a base made of a metal plate and arranged on an anode side of the membrane electrode assembly, and a second separator having a base made of a metal plate and arranged on a cathode side of the membrane electrode assembly. The first separator and the second separator, which are adjacent to each other in the laminating direction, are joined to each other through laser welding. The method includes a step of forming a film including conductive particles on an entire surface of the second separator that is intended to be opposed to the membrane electrode assembly and a step of laser-welding the first separator and the second separator to each other by irradiating, with laser, an exposed portion of the first separator where the base of the first separator is exposed.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

An embodiment will now be described with reference to FIGS. 1 to 3C.

Figure 1:
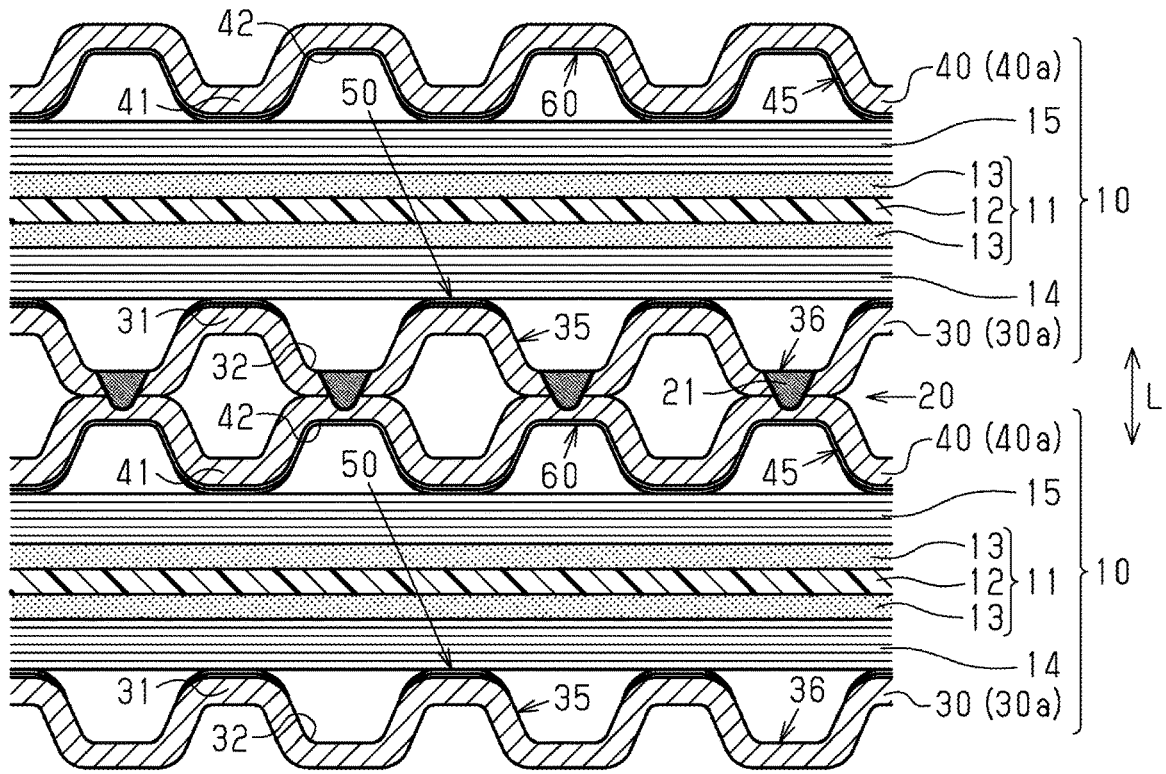
FIG. 1 is an enlarged cross-sectional view of a fuel cell stack, mainly showing single cells including a separator assembly for a fuel cell according to an embodiment.

As shown in FIG. 1, the fuel cell stack of a polymer electrolyte fuel cell includes single cells 10 laminated in a laminating direction L (vertical direction in FIG. 1). Each single cell 10 includes a membrane electrode assembly 11, a first separator 30, and a second separator 40. The first separator 30 and the second separator 40 hold the membrane electrode assembly 11 in between. The membrane electrode assembly 11 includes an electrolyte membrane 12 made of a polymer electrolyte film and two electrode catalyst layers 13 that hold the electrolyte membrane 12 in between. A gas diffusion layer 14 made of carbon fiber is arranged between the membrane electrode assembly 11 and the first separator 30. A gas diffusion layer 15 made of carbon fiber is arranged between the membrane electrode assembly 11 and the second separator 40.

The first separator 30 includes a base 30a made of a metal plate such as a stainless steel plate and is located on the anode side of the membrane electrode assembly 11. The first separator 30 includes first projections 31 and first recesses 32, both of which extend. The first projections 31 and the first recesses 32 are alternately arranged. The top surface (upper surface in FIG. 1) of each first projection 31 of the first separator 30 abuts the gas diffusion layer 14, which is located on the anode side. The space defined by each first recess 32 of the first separator 30 and the gas diffusion layer 14 defines a gas passage through which fuel gas such as hydrogen gas flows.

The second separator 40 includes a base 40a made of a metal plate such as a stainless steel plate and is located on the cathode side of the membrane electrode assembly 11. The second separator 40 includes second projections 41 and second recesses 42, both of which extend. The second projections 41 and the second recesses 42 are alternately arranged. The top surface (lower surface in FIG. 1) of each second projection 41 of the second separator 40 abuts the gas diffusion layer 15, which is located on the cathode side. The space defined by each second recess 42 of the second separator 40 and the gas diffusion layer 15 defines a gas passage through which fuel gas such as oxidant gas flows.

The space defined by the back surface of each first projection 31 of the first separator 30 and the back surface of each second projection 41 of the second separator 40 configures a cooling passage through which coolant flows.

Figure 2:
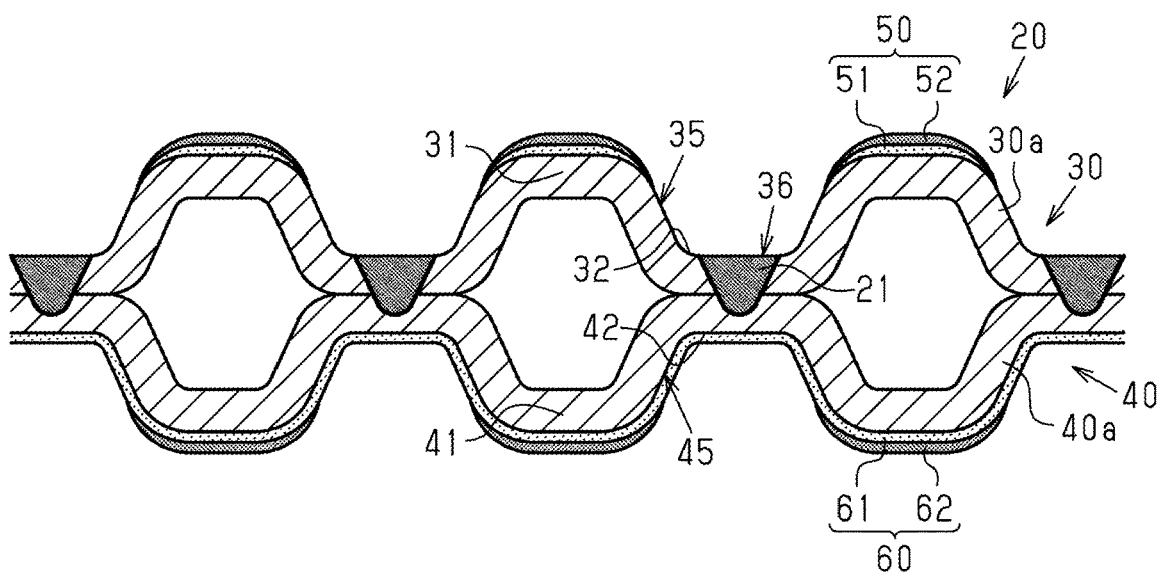
FIG. 2 is an enlarged cross-sectional view of the separator assembly shown in FIG. 1.

As shown in FIGS. 1 and 2, the surface (upper surface in FIGS. 1 and 2) of the first separator 30 opposed to the membrane electrode assembly 11 defines a first surface 35. A film 50 is arranged on the part of the first surface 35 corresponding to the top surface of each first projection 31 that abuts the membrane electrode assembly 11. The film 50 includes a first layer 51 applied to the top surface of the first projection 31 and a second layer 52 applied to the upper surface of the first layer 51. The film 50 is not arranged on a portion of the first surface 35 of the first separator 30 other than the part corresponding to the top surface of the first projection 31. Instead, the base 30a is exposed at the part on which the film 50 is not arranged. The portion where the base 30a is exposed is hereinafter referred to as an exposed portion 36.

The surface (lower surface in FIGS. 1 and 2) of the second separator 40 opposed to the membrane electrode assembly 11 defines a second surface 45. A film 60 is arranged on the second surface 45. The film 60 includes a first layer 61 applied to the entire second surface 45 and a second layer 62 applied to the upper surface of the first layer 61.

The first layers 51 and 61 include conductive particles made of titanium nitride and binder made of epoxy plastic.

The second layers 52 and 62 include graphite particles and binder made of polyvinylidene difluoride (PVDF) plastic. Polyvinylidene difluoride is a thermoplastic, and epoxy plastic is a thermosetting plastic. The thermosetting temperature of epoxy plastic is lower than the melting point of a polyvinylidene difluoride plastic.

The first separator 30 and the second separator 40, which are adjacent to each other in the laminating direction L of the single cells 10, are joined to each other through laser welding. The unit of the first separator 30 and the second separator 40 joined to each other is hereinafter referred to as a separator assembly 20.

The separator assembly 20 includes a joined portion 21 formed by joining the bottom of each first recess 32 of the first separator 30 and the bottom of each second recess 42 of the second separator 40 to each other through laser welding. The joined portion 21 is formed by irradiating, with laser, a part of the exposed portion 36 of the first separator 30 corresponding to the bottom of each first recess 32. The joined portion 21, which is a nugget, does not reach the second surface 45 of the second separator 40.

The method for manufacturing the separator assembly 20 will now be described.

Figure 3A:
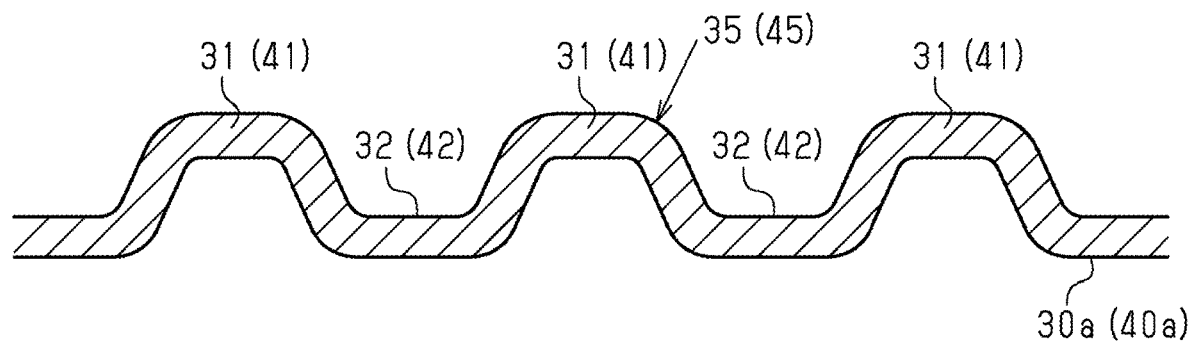
FIG. 3A is a cross-sectional view of a pressed base, illustrating the process of manufacturing the separator assembly shown in FIG. 1.

First, as shown in FIG. 3A, a press die (not shown) is used to press the base 30a of the first separator 30 to form the first projections 31 and the first recesses 32 on the base 30a. Using the same method, the second projections 41 and the second recesses 42 are formed on the base 40a of the second separator 40.

Figure 3B:
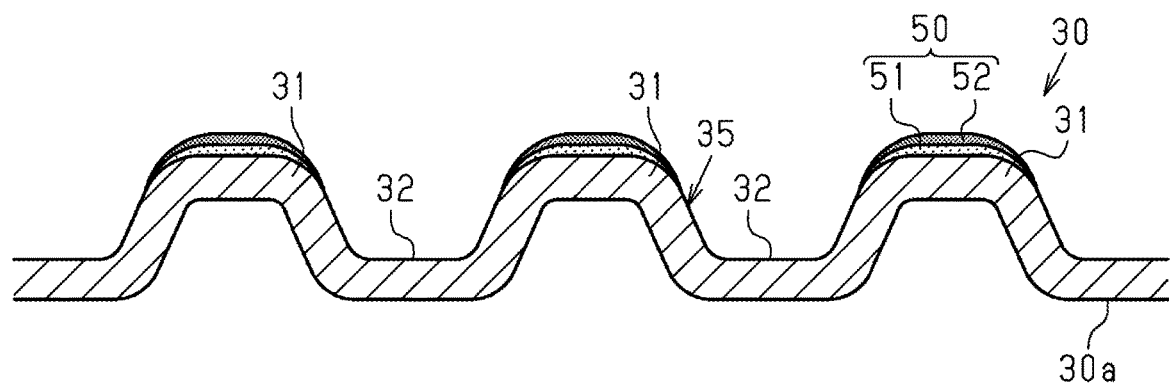
FIG. 3B is a cross-sectional view of a first separator, illustrating the process of manufacturing the separator assembly shown in FIG. 1.

Next, as shown in FIG. 3B, the first layer 51 is applied to the part of the first surface 35 of the base 30a that abuts the membrane electrode assembly 11, that is, the top surface of each first projection 31. Subsequently, the second layer 52 is applied to the upper surface of the first layer 51. Then, the first layer 51 and the second layer 52 are thermocompression-bonded to the base 30a. In this manner, the first separator 30 is manufactured.

Figure 3C:
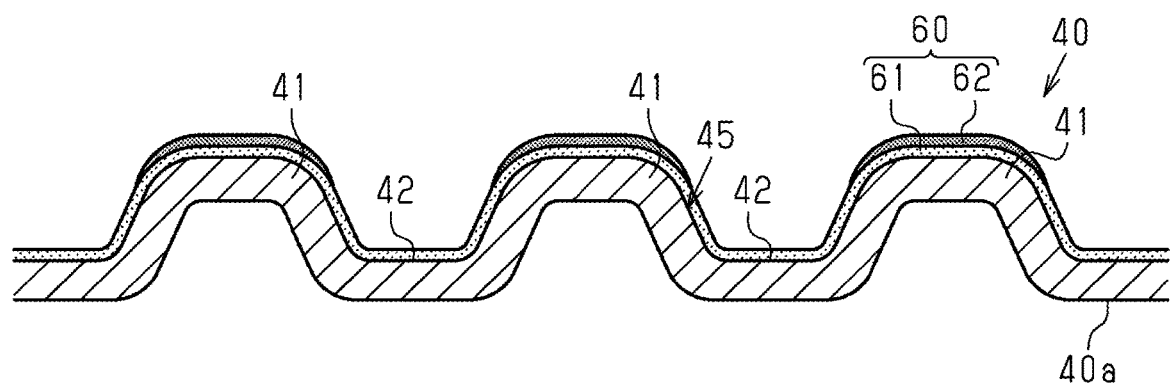
FIG. 3C is a cross-sectional view of a second separator, illustrating the process of manufacturing the separator assembly shown in FIG. 1.

Afterwards, as shown in FIG. 3C, the first layer 61 is applied to the entire second surface 45 of the base 40a. Subsequently, the second layer 62 is applied to the upper surface of the part of the first layer 61 corresponding to the top surface of each second projection 41. Then, the first layer 61 and the second layer 62 are thermocompression-bonded to the base 40a. In this manner, the second separator 40 is manufactured.

Subsequently, as shown in FIG. 2, the back surface of the first separator 30 located on the opposite side from the first surface 35 and the back surface of the second separator 40 located on the opposite side from the second surface 45 are abutted against each other. In this state, the exposed portion 36 is irradiated with laser from the first separator 30 to perform welding. This forms the joined portion 21, where the first separator 30 and the second separator 40 are joined to each other through laser welding. In this manner, the separator assembly 20 is manufactured by joining the first separator 30 to the second separator 40.

The advantages of the present embodiment will now be described.

(1) The separator assembly 20 for a fuel cell includes the first separator 30, the second separator 40, and the joined portion 21. The first separator 30 and the second separator 40 are adjacent to each other in the laminating direction L. The first separator 30 is configured to be located on the anode side of the membrane electrode assembly 11. The first separator 30 includes the first surface 35, which is intended to be opposed to the membrane electrode assembly 11. The first surface 35 of the first separator 30 includes the exposed portion 36, where the base 30a of the first separator 30 is exposed. The second separator 40 is configured to be located on the cathode side of the membrane electrode assembly 11. The second separator 40 includes the second surface 45, which is intended to be opposed to the membrane electrode assembly 11. The film 60, which includes conductive particles, is arranged on the entire second surface 45 of the second separator 40. The joined portion 21 is formed by irradiating the exposed portion 36 of the first separator 30 with laser.

When the fuel cell is running, the cathode side of the membrane electrode assembly 11 has a higher potential than the anode side. Thus, corrosion resulting from potential difference tends to occur in the second separator 40 located on the cathode side of the membrane electrode assembly 11.

In the above-described structure, the film 60 is formed on the entire second surface 45 of the second separator 40. This limits corrosion of the second surface 45 resulting from potential difference.

The joined portion 21, where the first separator 30 and the second separator 40 are joined to each other, is formed by irradiating the exposed portion 36 of the first separator 30 with laser. This prevents the films 50 and 60 from being irradiated with laser and thus limits the occurrence of weld failure resulting from laser irradiation on the films 50 and 60.

(2) The film 50, which includes conductive particles, is arranged on the part of the first surface 35 of the first separator 30 configured to abut the membrane electrode assembly 11.

This structure limits increases in the contact resistance between the membrane electrode assembly 11 and the first separator 30.

(3) The method for manufacturing the separator assembly 20 for a fuel cell includes a step of forming the film 60, which includes conductive particles, on the entire second surface 45 of the second separator 40, which is intended to be opposed to the membrane electrode assembly 11. This method also includes a step of laser-welding the first separator 30 and the second separator 40 to each other by irradiating the exposed portion 36 of the first separator 30, where the base 30a of the first separator 30 is exposed, with laser.

Using the method, the same advantage as the above-described advantage (1) is obtained.

Modifications

It should be apparent to those skilled in the art that the present invention may be embodied in many other specific forms without departing from the spirit or scope of the invention. Particularly, it should be understood that the present invention may be embodied in the following forms.

Instead of titanium nitride of which the first layers 51 and 61 are made, other conductive particles such as titanium carbide or titanium boride may be used.

Instead of graphite particles of which the first layers 51 and 61 are made, other conductive particles such as carbon black may be used.

Instead of arranging the film 50 on the first surface 35 of the first separator 30, the entire first surface 35 may be configured by the exposed portion 36.

The exposed portion 36 may configure only the part of the first surface 35 of the first separator 30 corresponding to the joined portion 21, and the film 50 may be arranged on a portion other than the exposed portion 36. In this case, the first surface 35 of the first separator 30 is coated by the film 50 over a broader range. This effectively limits corrosion.

The material of the base of the first separator and the material of the base of the second separator may be changed to different metal materials other than stainless steel. The metal materials include, for example, pure titanium, titanium alloy, aluminum alloy, and magnesium alloy.

Therefore, the present examples and embodiments are to be considered as illustrative and not restrictive and the invention is not to be limited to the details given herein, but may be modified within the scope and equivalence of the appended claims.

The invention claimed is:

1. A separator assembly for a fuel cell applied to a fuel cell stack configured by single cells laminated in a laminating direction, each of the single cells including a membrane electrode assembly, a first separator having a base made of a metal plate and arranged on an anode side of the membrane electrode assembly, and a second separator having a base made of a metal plate and arranged on a cathode side of the membrane electrode assembly, the separator assembly comprising:

the first separator;

the second separator, wherein the first separator and the second separator are adjacent to each other in the laminating direction; and a joined portion where the first separator and the second separator are joined to each other through laser welding, wherein the first separator includes a first surface that is intended to be opposed to the membrane electrode assembly, the first surface of the first separator includes an exposed portion where the base of the first separator is exposed, the second separator includes a second surface that is intended to be opposed to the membrane electrode assembly, a film including conductive particles is arranged on the entire second surface of the second separator, and the joined portion is formed by irradiating the exposed portion of the first separator with laser.

2. The separator assembly according to claim 1, wherein a film including conductive particles is arranged on a part of the first surface of the first separator that is configured to abut the membrane electrode assembly.

3. A method for manufacturing a separator assembly for a fuel cell applied to a fuel cell stack configured by single cells laminated in a laminating direction, each of the single cells including a membrane electrode assembly, a first separator having a base made of a metal plate and arranged on an anode side of the membrane electrode assembly, and a second separator having a base made of a metal plate and arranged on a cathode side of the membrane electrode assembly, the first separator and the second separator, which are adjacent to each other in the laminating direction, being joined to each other through laser welding, the method comprising:

a step of forming a film including conductive particles on an entire surface of the second separator that is intended to be opposed to the membrane electrode assembly, and a step of laser-welding the first separator and the second separator to each other by irradiating, with laser, an exposed portion of the first separator where the base of the first separator is exposed.

* * * * *